(12) United States Patent
Chen et al.

(10) Patent No.: US 12,293,870 B2
(45) Date of Patent: May 6, 2025

(54) METHOD FOR MANUFACTURING PLASTIC ARTICLE FOR MAGNETIC ELEMENT

(71) Applicant: Delta Electronics (Shanghai) Co., Ltd., Shanghai (CN)

(72) Inventors: Li Chen, Shanghai (CN); Jiayou Ma, Shanghai (CN); Haijun Yang, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 848 days.

(21) Appl. No.: 17/453,867

(22) Filed: Nov. 8, 2021

(65) Prior Publication Data
US 2022/0181077 A1 Jun. 9, 2022

(30) Foreign Application Priority Data

Dec. 7, 2020 (CN) .......................... 202011438345.7

(51) Int. Cl.
| H01F 41/04 | (2006.01) |
| H01F 27/28 | (2006.01) |
| H01F 27/29 | (2006.01) |
| H01F 27/32 | (2006.01) |

(52) U.S. Cl.
CPC ......... *H01F 41/04* (2013.01); *H01F 27/2823* (2013.01); *H01F 27/29* (2013.01); *H01F 27/325* (2013.01); *Y10T 29/4902* (2015.01)

(58) Field of Classification Search
CPC .......... H01F 41/04; H01F 27/325; H01F 5/04; Y10T 29/49826; Y10T 29/4902

USPC ........................................ 29/602.1, 604, 848
See application file for complete search history.

(56) References Cited

U.S. PATENT DOCUMENTS

| 9,449,745 B2 * | 9/2016 | Inaba .................... H01F 27/255 |
| 2013/0008890 A1 * | 1/2013 | Esaki .................... H01F 27/323 |
| | | 219/647 |

FOREIGN PATENT DOCUMENTS

| CN | 104658744 A | 5/2015 |
| CN | 206528010 U | 9/2017 |
| CN | 207359493 U | 5/2018 |
| CN | 208946555 U | 6/2019 |
| CN | 209216736 U | 8/2019 |
| CN | 210722717 U | 6/2020 |
| IN | 208324027 U | 1/2019 |
| JP | 2008147265 A | 6/2008 |

* cited by examiner

*Primary Examiner* — Thiem D Phan
(74) *Attorney, Agent, or Firm* — CKC & Partners Co., LLC

(57) ABSTRACT

A method for manufacturing a plastic article for a magnetic element, comprising: providing a first die core and a second die core opposite to each other along a first direction; providing a third die core adjacent to the first die core and the second die core along a second direction wherein the second direction is perpendicular to the first direction; providing at least one hole insert for forming a pin-fixing hole for fixing a lead-pin of a winding of the magnetic element, wherein the at least one hole insert is detachably mounted to at least one of the first die core, the second die core, and the third die core; and combining the first die core, the second die core, the third die core, and the at least one hole insert to form a mold with a cavity, wherein the cavity is injection molded to manufacture the plastic article.

24 Claims, 13 Drawing Sheets

METHOD FOR MANUFACTURING PLASTIC ARTICLE FOR MAGNETIC ELEMENT

CROSS-REFERENCE TO RELATED APPLICATIONS

This non-provisional application claims priority under 35 U.S.C. § 119 (a) on Patent Application No. 202011438345.7 filed in P. R. China on Dec. 7, 2020, the entire contents of which are hereby incorporated by reference.

Some references, if any, which may include patents, patent applications and various publications, may be cited and discussed in the description of this disclosure. The citation and/or discussion of such references, if any, is provided merely to clarify the description of the present disclosure and is not an admission that any such reference is "prior art" to the present disclosure described herein. All references listed, cited and/or discussed in this specification are incorporated herein by reference in their entireties and to the same extent as if each reference was individually incorporated by reference.

FIELD OF THE INVENTION

The disclosure relates to the field of injection molding, and particularly to a method for manufacturing a plastic article for a magnetic element, and the plastic article.

BACKGROUND OF THE INVENTION

According to differences in power or current of the magnetic elements, the diameter range of the selected wire is relatively large. Therefore, under the condition that the same magnetic cores are selected, same bobbins can hardly be shared due to the different diameters of the selected wires. The reasons are mainly as follows. Fixing wires on the pins which provided on the bobbin is only suitable for winding with a small strand or a small diameter. When the wire diameter or the strand is large (e.g., over 0.1×80 strands), due to the limitation of the current conductivity of the pins, the wire terminal serves as a lead-pin. The bobbin with the wire terminal serving as the lead-pin must be designed to match the diameter and the strand of the selected wire. Such that, different molds are needed for different diameters and/or strands of the wire. Currently, the multi-strand wire is typically in a range like from 0.1×80 strands (with a wire diameter of about Ø1.7) to 0.1×350 strands (with a wire diameter of about Ø3.5), or even more. When a difference of the strands exceeds 10, a new mold is needed again. When the strands exceed 4 times, even more molds are needed, which largely increases the mold cost. Alternatively, an additional base or substrate can be used to fix the lead-pin, which, however, also largely increases the labor-hour and the cost.

Currently, there are several common solutions for solving the problem of using the wire serves as the lead-pin comprises: In one method, wires are wound on the bobbin, and an additional epoxy (e.g., FR-4) base or substrate is assembled, on which a hole is drilled to fix the lead-pin. This process is complex, and largely increases labor cost. In another method, adjust a thimble on the mold and slightly adjust the diameter of the hole within a range of 0.5 mm so that the bobbin can be shared by wires of proximate diameter and strand. This common mold method can only adjust the diameter size of the hole, but cannot adjust the size of the product or the position of the center of the hole. Therefore, the existing product with holes of small diameter cannot satisfy the requirement of a large wire diameter. Also, the wall between the holes is not sufficient in thickness and strength for the large wire. Alternatively, the existing product with holes of large diameter can satisfy the requirement of a small hole diameter. In such case, however, the size of the product is too large, and the occupied space is large. Therefore, both methods cannot solve the existing problem well.

In view of this, it is necessary to develop a method for manufacturing a plastic article for a magnetic element, and the plastic article, so as to solve or relieve at least one of the problems in the prior art.

SUMMARY OF THE INVENTION

According to one aspect of the present disclosure, a method for manufacturing a plastic article for a magnetic element is provided. The method comprises providing a first die core and a second die core opposite to each other along a first direction; providing a third die core adjacent to the first die core and the second die core along a second direction wherein the second direction is perpendicular to the first direction; providing at least one hole insert for forming a lead-pin fixing hole for fixing a lead-pin of a winding of the magnetic element, wherein the at least one hole insert is detachably mounted to at least one of the first die core, the second die core, and the third die core; and combining the first die core, the second die core, the third die core, and the at least one hole insert to form a mold with a cavity, wherein the cavity is injection molded to manufacture the plastic article.

According to one aspect of the present disclosure, a plastic article for a magnetic element is provided, which comprises a winding tube; and a blade located at an end of the winding tube. The blade comprises a wire clamping groove defined by an opening of the blade and an external wall of the winding tube, for limiting a lead-pin of a winding of the magnetic element; a lead-pin-fixing hole for fixing the lead-pin; and a wire trimming groove arranged between the wire clamping groove and the lead-pin-fixing hole. According to one aspect of the present disclosure, a plastic article for a magnetic element is provided, which comprises a bottom plate, a vertical plate perpendicular to the bottom plate, and a pin plate provided with a pin-fixing hole and arranged on the vertical plate in parallel to the bottom plate.

According to one aspect of the present disclosure, a plastic article for a magnetic element is provided, which comprises: a bottom plate; a vertical plate perpendicular to the bottom plate; and a pin plate comprising a pin-fixing hole and arranged on the vertical plate in parallel to the bottom plate.

BRIEF DESCRIPTION OF THE DRAWINGS

Reference will now be made in detail to embodiments of the present disclosure, examples of which are illustrated in the accompanying drawings, in which:

FIG. 6-1 is a bottom view of the incoming and outgoing lead-pins of the bobbin according to the third to the fourth embodiments of the disclosure.

FIG. 9-1 is a structural diagram of the mold for manufacturing a plastic article for a magnetic element according to the fifth to the sixth embodiments of the disclosure.

FIG. 9-2 is a structural diagram of the vertical bobbin for a magnetic element according to the fifth to the sixth embodiments of the disclosure.

DETAILED DESCRIPTION OF THE PREFERRED EMBODIMENT

The disclosure will now be described in details through following illustrative embodiments. However, it should be understood that an element, a structure or a feature in an embodiment can be beneficially incorporated into other embodiments without further recitation.

It should also be understood that "comprises/comprising" when used in the specification is taken to specify the presence of stated features, integers, steps or components but does not preclude the presence or addition of one or more other features, integers, steps or components or groups thereof.

Some typical examples that represent features and advantages of the disclosure are described in details in subsequent explanations. It shall be understood that the disclosure can have various variations in different forms without departing from scope of the disclosure, and explanations and illustrations shall serve to explain in essence, instead of limiting the disclosure.

Figure 1:
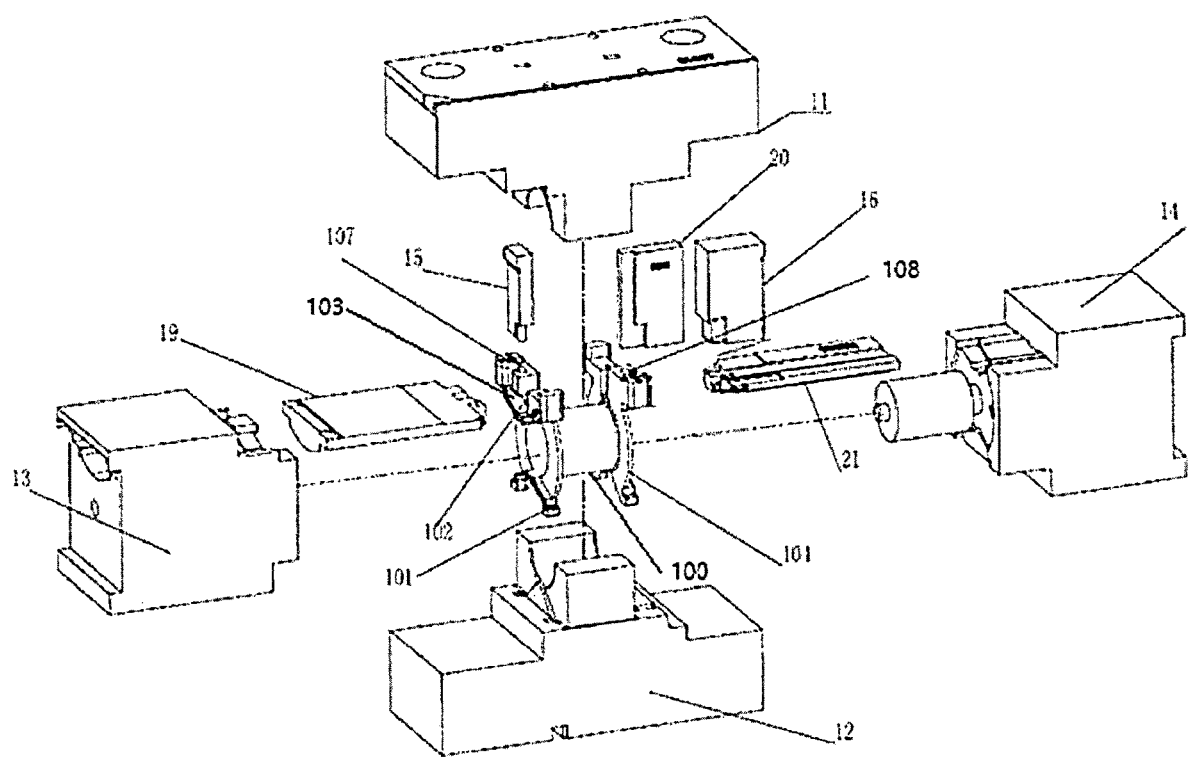
FIG. 1 is a structural diagram of the mold for manufacturing the plastic article for the magnetic element according to the first to fourth embodiments of the disclosure.
Figure 2:
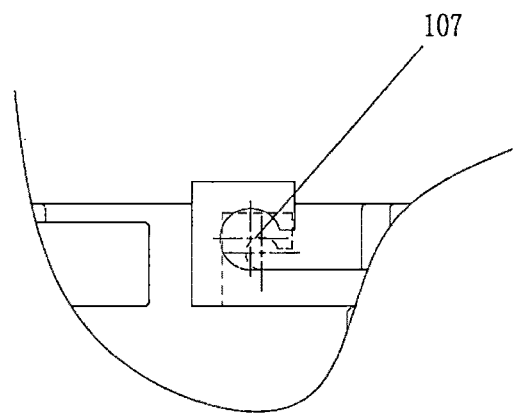
FIG. 2 is an enlarged diagram of the lead pin-fixing hole according to the disclosure.
Figure 10:
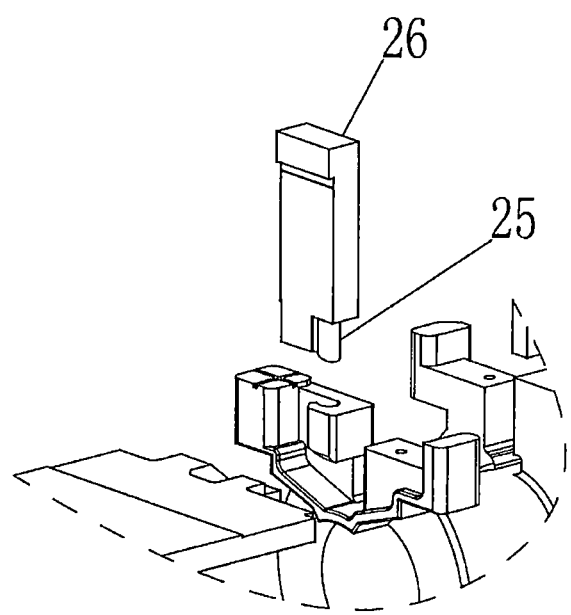
FIG. 10 is a local enlarged diagram of the hole insert in the mold according to the first to the sixth embodiments of the disclosure.

Now referring to FIG. 1, which is a structural diagram of the mold for manufacturing the plastic article for the magnetic element according to the first to fourth embodiments of the disclosure. It shall be noted that FIG. 1 shows the mold structure in the first to fourth embodiments. According to different numbers of components in the mold shown in FIG. 1, the disclosure provides four embodiments to explain the differences in the bobbins formed by the mold. The mold according to the above embodiments comprises a first die core, a second die core, a third die core, a fourth die core, and at least one hole insert detachably mounted to the first die core. In the present disclosure, the mold for manufacturing the plastic article for the magnetic element according to the first to the fourth embodiments of the disclosure is provided to form a bobbin, e.g. a horizontal bobbin, which comprises a winding tube for winding and a blade at one end of the winding tube. The blade comprises a pin-fixing hole for fixing the winding, and an enlarged diagram of the pin-fixing hole is shown in FIG. 2. FIG. 10 is a local enlarged diagram of a hole insert according to the first embodiment to a sixth embodiment of the disclosure, which comprises a hole insert body 26 mounted in the die core and a core pin 25 for forming the pin-fixing hole. The hole insert may be integrally formed. The core pin 25 may have a cross section of circular, square, rectangular, racetrack-shaped, U-shaped, or C-shaped. Particularly, the cross section of the core pin 25 may be circular (●), square (■), rectangular, racetrack-shaped ( ● ), U-shaped ( ◧ ), C-shaped ( ◨ ) shape, or any deformations based on the above shapes.

Referring to FIG. 1 again, which discloses the mold structure and the method for manufacturing the plastic article for the magnetic element according to the first embodiment of the disclosure. In the first embodiment, the mold comprises a first die core 11, a second die core 12, a third die core 13, a fourth die core 14, and a first hole insert 15 detachably mounted to the first die core 11. The bobbin formed according to this embodiment comprises a winding tube for winding and a first blade 101 at one end of the winding tube. The first blade 101 comprises a first pin-fixing hole 107 for fixing the winding. The first hole insert 15 is configured to form the first pin-fixing hole 107 of the first blade 101. The mold in this embodiment is configured to form a bobbin, and particularly, a horizontal bobbin.

Figure 14:
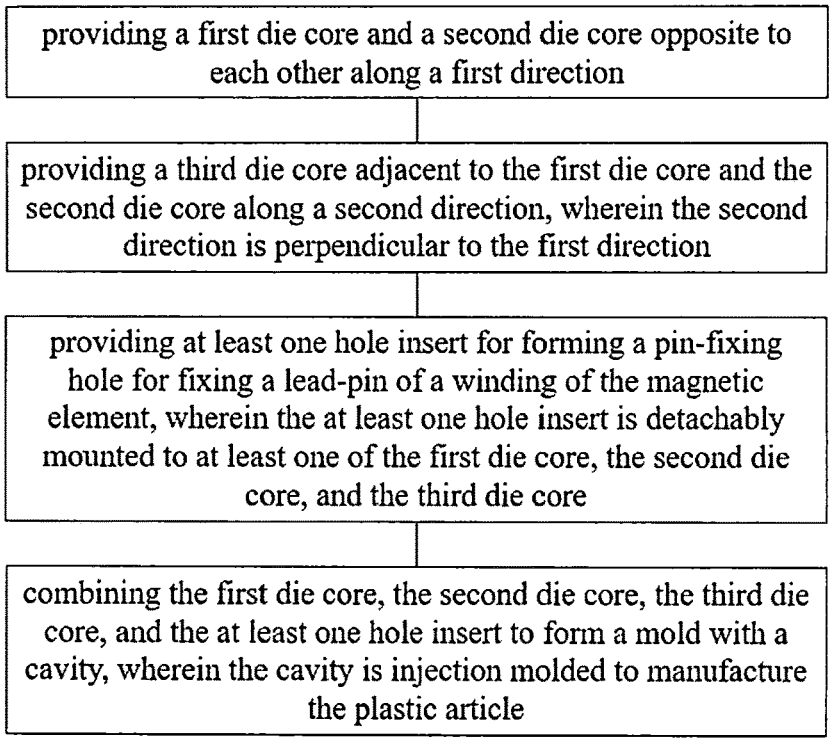
FIG. 14 is a flowchart showing the method for manufacturing the plastic article for the magnetic element according to an example of the disclosure.

Referring to FIG. 14, according to an example of the disclosure, a method for manufacturing the plastic article for the magnetic element comprises:

providing a first die core and a second die core opposite to each other along a first direction;

providing a third die core adjacent to the first die core and the second die core along a second direction, wherein the second direction is perpendicular to the first direction;

providing at least one hole insert for forming a pin-fixing hole for fixing a lead-pin of a winding of the magnetic element, wherein the at least one hole insert is detachably mounted to at least one of the first die core, the second die core, and the third die core; and combining the first die core, the second die core, the third die core, and the at least one hole insert to form a mold with a cavity, wherein the cavity is injection molded to manufacture the plastic article.

Preferably, the manufacturing method of the disclosure may further comprises: providing a fourth die core opposite to the third die core along the second direction.

Figure 15:
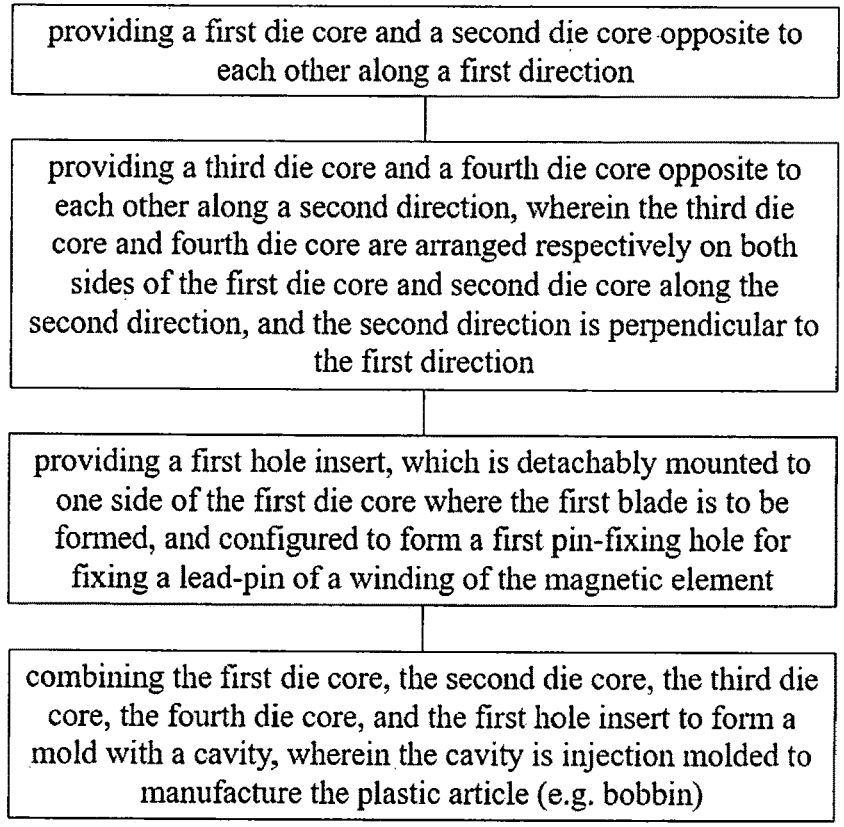
FIG. 15 is a flowchart showing the method for manufacturing the plastic article (e.g. a horizontal bobbin) with the first fixing-pin hole according to an example of the disclosure.

Referring to FIG. 15 with the reference of FIG. 1, the first embodiment of the disclosure discloses a method for manufacturing a plastic article for a magnetic element, the method comprising:

providing a first die core 11 and a second die core 12 opposite to each other along a first direction;

providing a third die core 13 and a fourth die core 14 opposite to each other along a second direction, wherein the third die core 13 and fourth die core 14 are arranged respectively on both sides of the first die core 11 and second die core 12 along the second direction, and the second direction is perpendicular to the first direction;

providing a first hole insert 15, which is detachably mounted to one side of the first die core 11 where the first blade 101 is to be formed, and configured to form a first pin-fixing hole 107 for fixing a lead-pin of a winding of the magnetic element; and combining the first die core 11, the second die core 12, the third die core 13, the fourth die core 14, and the first hole insert 15 to form a mold with a cavity, wherein the cavity is injection molded to manufacture the plastic article (e.g. bobbin).

Referring to FIG. 1 and FIG. 15, the manufacturing method of the disclosure may additionally or optionally comprise the pre-selected first hole insert 15, and a dimension of the first hole insert 15 is selected according to the diameter size and/or the shape of the winding. The selected first hole insert 15 is detachably mounted to one side of the first die core 11 where the first blade 101 is to be formed. The first hole insert 15 is configured to form the first pin-fixing hole 107 on the first blade 101. Particularly, during injection molding with the combined mold, the hole insert body 26 of the first hole insert 15 is mounted to the first die core 11, while the core pin 25 of the first hole insert 15 is configured to form the first pin-fixing hole 107. When bobbins with a pin-fixing hole having different diameter size and/or the shape need to be produced, the first die core 11, the second die core 12, the third die core 13, the fourth die core 14, and the hole insert body 26 of the first hole insert 15, are kept unchanged. Another core pin 25 with different dimension is selected according to the need, so as to form a new first hole insert 15 with different dimensions. By replacing the original first hole insert 15 with the new one, the bobbin with the first pin-fixing hole 107 of different shape, size, opening orientation, and/or hole center position can be formed. In one practical application, the first hole insert 15 is replaced by the one having a core pin adapted to the diameter of the winding. For example, when the diameter of the winding is 03.5, the first hole insert 15 is replaced with the one having a core pin 25 with a dimension of about 03.5.

Figure 4:
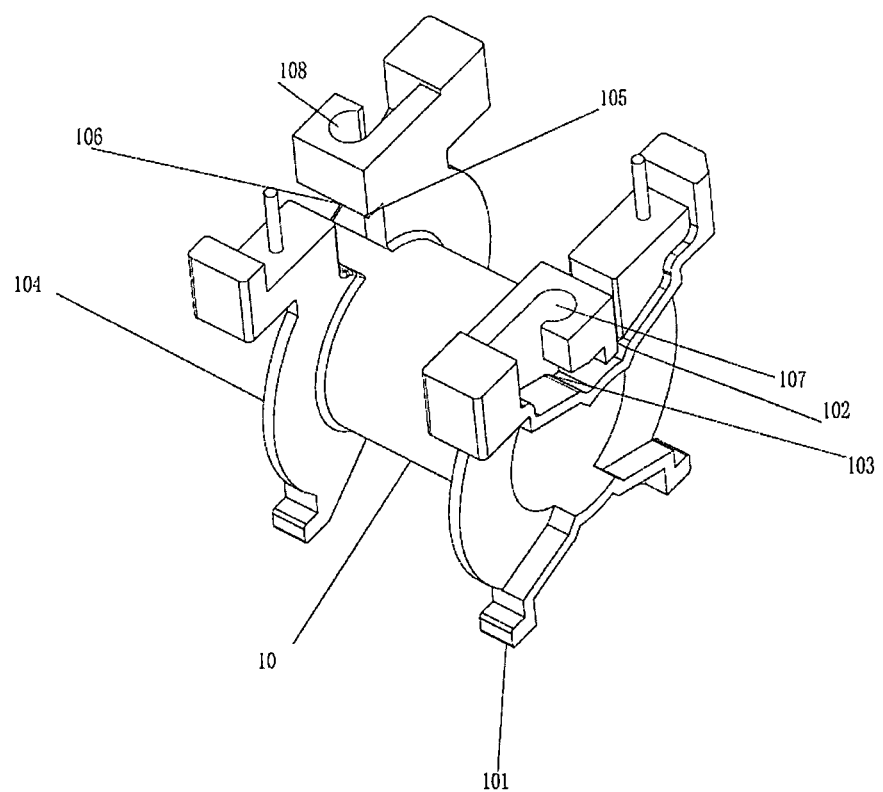
FIG. 4 is a structural diagram of the bobbin according to the fourth embodiment of the disclosure.
Figure 6:
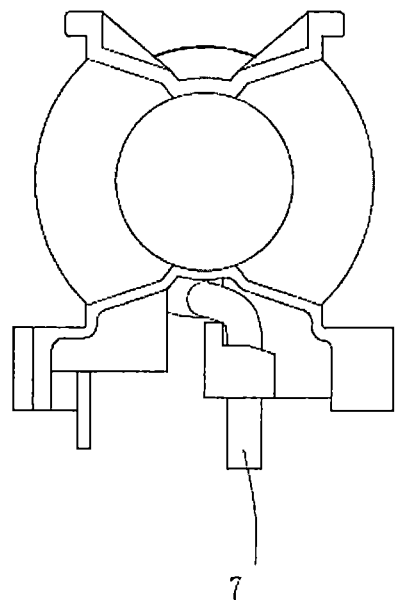
FIG. 6 is a structural diagram of the lead-pin of the bobbin according to the first to fourth embodiments of the disclosure.
Figures 1, 6:
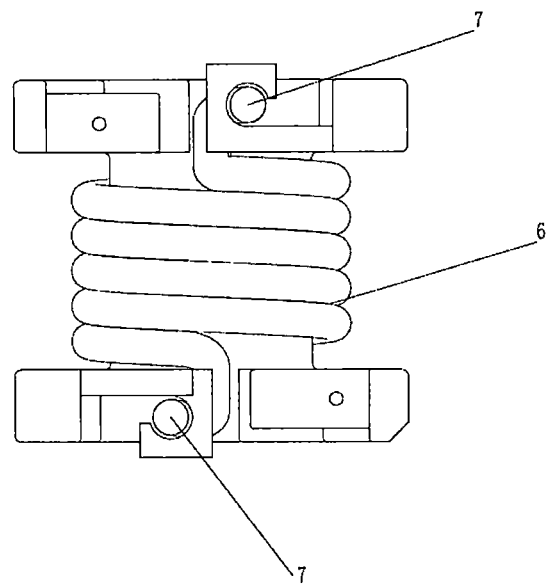

Referring to FIGS. 1 and 4, a mold according to a second embodiment of the disclosure may be configured to form a horizontal bobbin 100. The horizontal bobbin 100 comprises a winding tube for winding and a first blade 101 located at one end of the winding tube. The first blade 101 comprises a first pin-fixing hole 107 for fixing the winding, and a locating structure comprising a first wire clamping groove 102 and a first wire trimming groove 103. The winding that enters the bobbin via the first pin-fixing hole 107 and forms a lead-pin 7 passes through the first wire trimming groove 103 and then is located by the first wire clamping groove 102, and finally is wound around the winding tube of the bobbin. Referring to FIG. 6, FIG. 6 shows the lead-pin of the bobbin according to the first to the fourth embodiments of the disclosure. The mold structure in this embodiment is substantially the same as the mold structure in the first embodiment, and the main difference of the mold structure compared with the first embodiment is that the mold structure in this embodiment further comprises a first insert 19 which is detachably mounted to the third die core 13. The first insert 19 and the first hole insert 15 are configured to form the first wire clamping groove 102 and the first wire trimming groove 103 that match the diameter size and the shape of the winding.

The second embodiment also discloses a method for manufacturing a plastic article for a magnetic element, which is substantially the same as the method of the first embodiment, and the main difference of the method compared with the first embodiment is that the method of the second embodiment further comprises steps of forming the locating structure.

Figure 16:
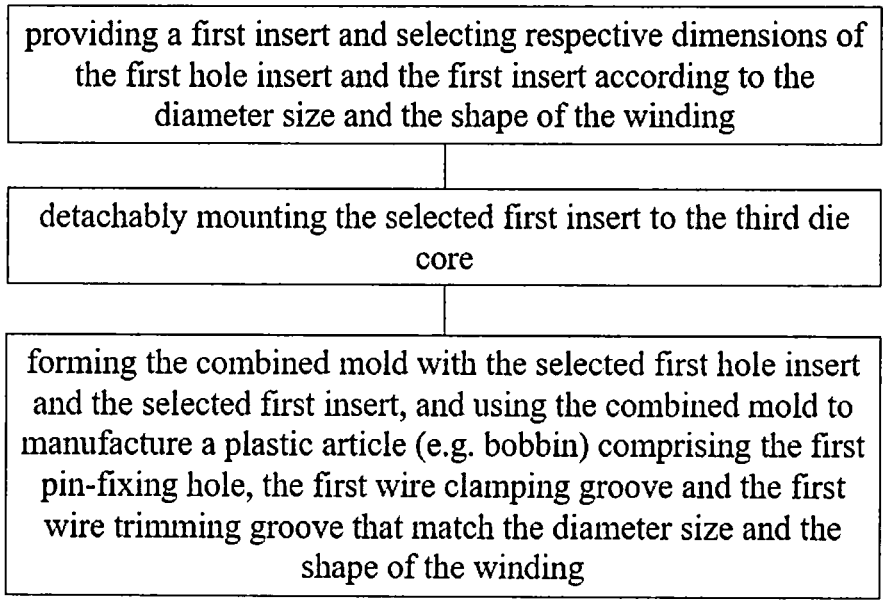
FIG. 16 is a flowchart showing the method of forming the locating structure of a plastic article (e.g. a horizontal bobbin) according to an example of the disclosure.

Particularly, referring to FIG. 16 with the reference of FIGS. 1 and 4, the method according to the second embodiment further comprises:

providing a first insert 19 and selecting respective dimensions of the first hole insert 15 and the first insert 19 according to the diameter size and the shape of the winding;

detachably mounting the selected first insert 19 to the third die core 13; and forming the combined mold with the selected first hole insert 15 and the selected first insert 19, and using the combined mold to manufacture a plastic article (e.g. bobbin) comprising the first pin-fixing hole 107, the first wire clamping groove 102 and the first wire trimming groove 103 that match the diameter size and the shape of the winding.

The first hole insert 15 and the first insert 19 are selected according to the diameter and/or the shape of the wire to be winded. The first insert 19 has a structure which is similar to that of the first hole insert 15, and comprises a first component mounted in the third die core 13 and a second component for assisting in forming the first wire clamping groove 102 and the first wire trimming groove 103. The first insert 19 can be integrally formed. When bobbins with a pin-fixing hole having different shape and/or diameter size need to be produced, the shapes and dimensions of the first die core 11, the second die core 12, the third die core 13, the fourth die core 14, the hole insert body 26 of the first hole insert 15 and the first component of the first insert 19, are kept unchanged. Dimensions and/or shapes of the core pin 25 of the first hole insert 15 and/or the second component of the first insert 19 is adjustable, so that the shape, size, opening orientation, and/or hole center position of the first pin-fixing hole 107, and/or dimensions of the first wire clamping groove 102 and/or the first wire trimming groove 103 can be changed to obtain a bobbin that matches the diameter and the shape of the winding. In one practical application, the first hole insert 15 and the first insert 19 are replaced with the ones having a core pin that matches the diameter of the winding. For example, when the diameter of the winding is Ø3.5, the first hole insert 15 is replaced with the one having a core pin 25 with a dimension of about Ø3.5.

Referring to FIG. 1, the third embodiment of the disclosure provides a bobbin, which is substantially the same as the bobbin in the second embodiment. And the main difference of the bobbin compared with the second embodiment is that the bobbin in this embodiment further comprises a second blade 104. The first blade 101 and the second blade 104 are respectively located at both ends of the winding tube. The second blade 104 comprises a second pin-fixing hole 108 for fixing the winding. A mold structure in this embodiment is substantially the same as the mold structure in the first embodiment, and the main difference of the mold structure compared with the second embodiment is that the mold structure in this embodiment further comprises a second hole insert 16 detachably mounted to a side of the first die core 11 where the second blade is to be formed. The second hole insert 16 is configured to form the second pin-fixing hole 108. The mold in this embodiment can be used to form a horizontal bobbin 100.

The third embodiment also discloses a method for manufacturing a plastic article for a magnetic element. The method is substantially the same as that in the second embodiment, and the main difference of the method compared the second embodiment is that the method in the third embodiment further comprises steps of forming the second pin-fixing hole.

Figure 17:
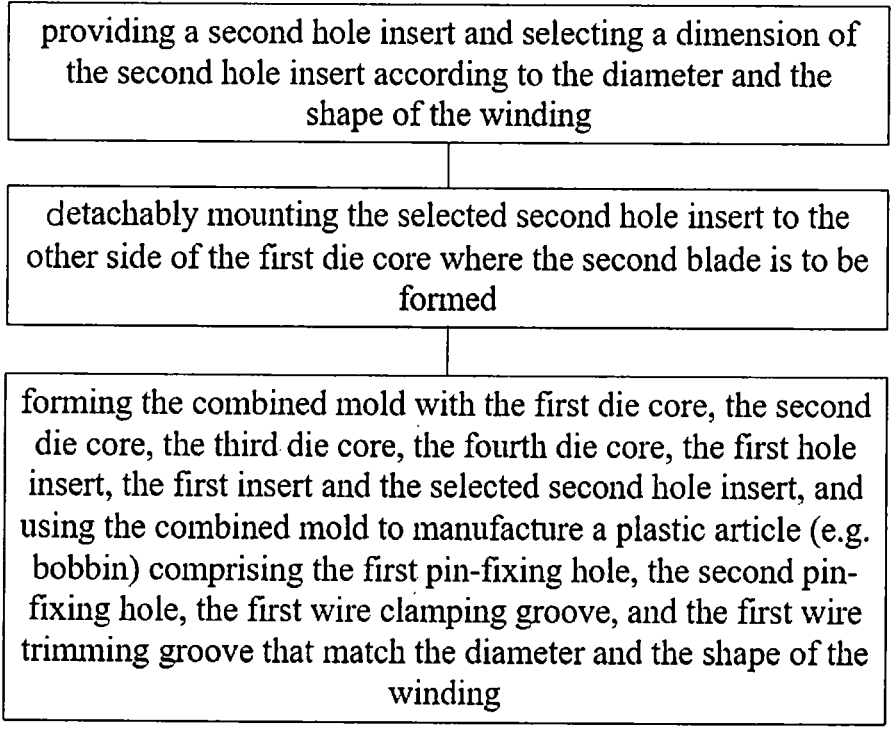
FIG. 17 is a flowchart showing the method of forming the second fixing-pin hole of a plastic article (e.g. a horizontal bobbin) according to an example of the disclosure.

Particularly, referring to FIG. 17 with the reference of FIG. 1, the manufacturing method in the third embodiment further comprises:

provides a second hole insert 16 and selecting a dimension of the second hole insert 16 according to the diameter and the shape of the winding;

detachably mounting the selected second hole insert 16 to the other side of the first die core 11 where the second blade is to be formed; and forming the combined mold with the first die core 11, the second die core 12, the third die core 13, the fourth die core 14, the first hole insert 15, the first insert 19 and the selected second hole insert 16, and using the combined mold to manufacture a plastic article (e.g. bobbin) comprising the first pin-fixing hole 107, the second pin-fixing hole 108, the first wire clamping groove 102, and the first wire trimming groove 103 that match the diameter and the shape of the winding.

Particularly, the second hole insert 16 is configured to form the second pin-fixing hole 108 for the lead-pin of the winding of the magnetic element. The second hole insert 16 has a structure which is the same as the structure of the first hole insert 15, and the details are omitted here. Similar to the second embodiment, dimensions of the first hole insert 15, the second hole insert 16, and the first insert 19 are selected according to the diameter and the shape of the winding. Thereby, shapes, sizes, opening orientations, and/or hole center positions of the first pin-fixing hole 107 and/or the second pin-fixing hole 108, and/or dimensions of the first wire clamping groove 102 and/or the first wire trimming groove 103 can be changed to obtain a bobbin that matches the diameter and the shape of the winding.

Figure 5:
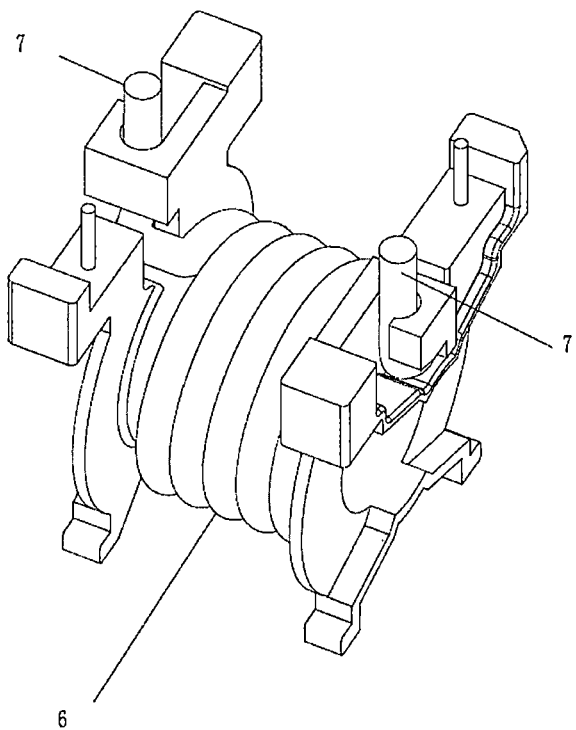
FIG. 5 is a structural diagram of the bobbin with winding according to the fourth embodiment of the disclosure.

Referring to FIGS. 1 and 4, the fourth embodiment of the disclosure provides a bobbin which is substantially the same as that in the third embodiment, and the difference of bobbin compared with the third embodiment is that the second blade 104 of the bobbin in this embodiment further comprises locating structure, which comprises a second wire clamping groove 105 and a second wire trimming groove 106. The wire wound out of the winding tube of the bobbin is firstly limited by the second wire clamping groove 105, and then passes through the second wire trimming groove 106, and finally is leaded out via the second pin-fixing hole 108 and forms an outgoing lead-pin of the winding, as shown in FIG. 5. The mold structure in this embodiment is substantially the same as the mold structure in the third embodiment, and the main difference of the mold structure compared with the third embodiment is that the mold structure in this embodiment further comprises a second insert 20, which is detachably mounted to the other side of the first die core 11 where the second blade 104 is to be formed, and a third insert 21, which is detachably mounted to the fourth die core 14. The second insert 20 and the third insert 21 are configured to form a locating structure on the second blade 104, i.e., the second wire clamping groove 105 and the second wire trimming groove 106.

The fourth embodiment also discloses a method for manufacturing a plastic article for a magnetic element, which is substantially the same as that in the third embodiment, and the main difference of the method compared with the third embodiment is that the manufacturing method in the fourth embodiment further comprises a step of making the second wire clamping groove 105 and the second wire trimming groove 106.

Figure 18:
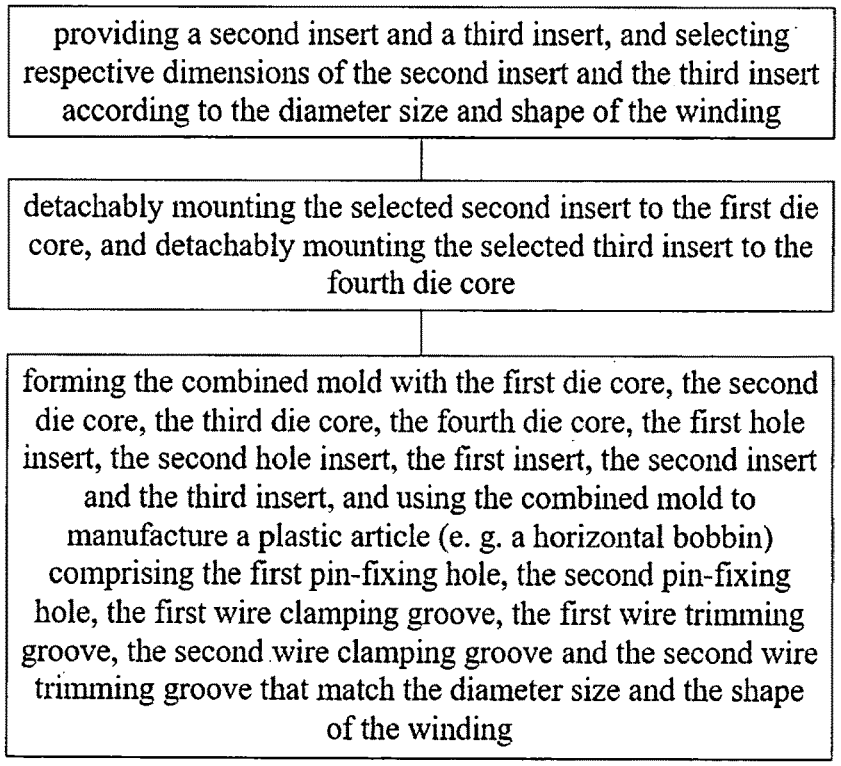
FIG. 18 is a flowchart showing the method of forming the second wire clamping groove and the second wire trimming groove of a plastic article (e.g. a horizontal bobbin) according to an example of the disclosure.

Referring to FIG. 18 with the reference of FIGS. 1 and 4, the manufacturing method according to the fourth embodiment further comprises:

providing a second insert 20 and a third insert 21, and selecting respective dimensions of the second insert 20 and the third insert 21 according to the diameter size and shape of the winding;

detachably mounting the selected second insert 20 to the first die core 11, and detachably mounting the selected third insert 21 to the fourth die core 14;

forming the combined mold with the first die core 11, the second die core 12, the third die core 13, the fourth die core 14, the first hole insert 15, the second hole insert 16, the first insert 19, the second insert 20 and the third insert 21, and using the combined mold to manufacture a plastic article (e.g. a horizontal bobbin 100) comprising the first pin-fixing hole 107, the second pin-fixing hole 108, the first wire clamping groove 102, the first wire trimming groove 103, the second wire clamping groove 105 and the second wire trimming groove 106 that match the diameter size and the shape of the winding.

Structures of the second insert 20 and the third insert 21 are similar with the structure of the first insert 19, the details of which are not repeatedly described here. Similar to the third embodiment, the dimensions of the first hole insert 15, the second hole insert 16, the first insert 19, the second insert 20 and/or the third insert 21 are selected according to the size and the shape of the winding. Thereby, shapes, sizes, opening orientations and/or hole center positions of the first pin-fixing hole 107 and/or the second pin-fixing hole 108, and/or dimensions of the first wire clamping groove 102, the first wire trimming groove 103, the second wire clamping groove 105 and/or the second wire trimming groove 106 can be changed to obtain a bobbin that matches the diameter size and the shape of the winding.

It shall be noted that in the first to fourth embodiments of the disclosure, the first direction is a radial direction of the bobbin.

During the injection molding of the bobbin, a mold cavity formed by the components in the mold structure is consistent with the shape of the plastic article (e.g. bobbin). Now describes the components in the mold structure which is configured to form the winding tube of the bobbin. In the first to fourth embodiments of the disclosure, the forming components used for forming the winding tube of the first die core 11 and the second die core 12 are both shape of semicircular arcs, so that when the first die core 11 and the second die core 12 are combined together, two semicircular arcs are assembled to form a cylindrical cavity for forming an external shape of the winding tube. The forming component of the fourth die core 14 is cylindrical protrusion, so that when the die core 13 and the die core 14 are combined, the third die core 13 abuts against the cylindrical protrusion of the fourth die core 14 for forming an internal shape of the winding tube, i.e., a hollow cavity of the winding tube. The first die core 11, the second die core 12, the third die core 13 and the fourth die core 14 are combined to form the winding tube of the bobbin.

Referring again to FIGS. 9-1 and 9-2, FIG. 9-1 is a structural diagram of the mold for manufacturing a plastic article of a magnetic element in the fifth to sixth embodiments of the disclosure, and FIG. 9-2 is a structural diagram of a vertical bobbin for a magnetic element in the fifth to sixth embodiments of the disclosure. The mold in the embodiment comprises a first die core 11*a*, a second die core 12*a*, a third die core 13*a*, a fourth die core 14*a*, and a first hole insert 15*a* detachably mounted to the second die core 12*a*. The mold is configured to form a vertical bobbin 200, which comprises a winding tube for winding and a first blade 101*a* located at one end of the winding tube and comprising a first pin-fixing hole 107*a*. The first hole insert 15*a* is configured to form the first pin-fixing hole 107*a* on the first blade 101*a*.

The fifth embodiment of the disclosure discloses a method for manufacturing a plastic article for a magnetic element, comprising:

providing a first die core 11*a* and a second die core 12*a* opposite to each other along a first direction;

providing a third die core 13*a* and a fourth die core 14*a* opposite to each other along a second direction, wherein the third die core 13*a* and the fourth die core 14*a* are arranged respectively on both sides of the first die core 11*a* and the second die core 12*a* along the second direction, and the second direction is perpendicular to the first direction;

providing a first hole insert 15*a*, which is detachably mounted to one side of the second die core 12*a* where the first blade 101*a* is to be formed, and configured to form a first pin-fixing hole 107*a* for a lead-pin of a winding of the magnetic element; and combining the first die core 11*a*, the second die core 12*a*, the third die core 13*a*, the fourth die core 14*a* and the first hole insert 15*a* to form a mold with a cavity, wherein the cavity is injection molded to manufacture the plastic article (e.g. bobbin).

The first hole insert 15*a* in this embodiment has the same structure as the first hole insert 15 in the first to fourth embodiments, the details of which are not repeatedly described here. The dimension of the first hole insert 15*a* is selected according to the diameter size and the shape of the winding, so that shape, size, opening orientation and/or hole center position of the first pin-fixing hole 107*a* can be adjusted to obtain a bobbin that matches the diameter size and the shape of the winding.

Referring to FIGS. 9-1 and 9-2 again, the disclosure provides a sixth embodiment. The bobbin in the sixth embodiment is substantially the same as that formed in the fifth embodiment, and the main difference of the bobbin compared with the fifth embodiment is that the first blade 101*a* of the bobbin further comprises a locating structure, which comprises a first wire clamping groove 102*a* and a first wire trimming groove 103*a*. The mold structure in this embodiment is substantially the same as that in the fifth embodiment, and the main difference of the mold structure compared with the fifth embodiment is that the mold in this embodiment further comprises a fourth insert 22, which is detachably mounted to the second die core 12*a* and configured to form the first wire clamping groove 102*a* and the first wire trimming groove 103*a* that match the diameter size and the shape of the winding.

The sixth embodiment also discloses a method for manufacturing a plastic article for a magnetic element, which is substantially the same as that in the fifth embodiment. And the main difference of the method compared with the fifth embodiment is that the manufacturing method in the sixth embodiment further comprises a step of forming the first wire clamping groove 102*a* and the first wire trimming groove 103*a*.

Figures 1, 9:
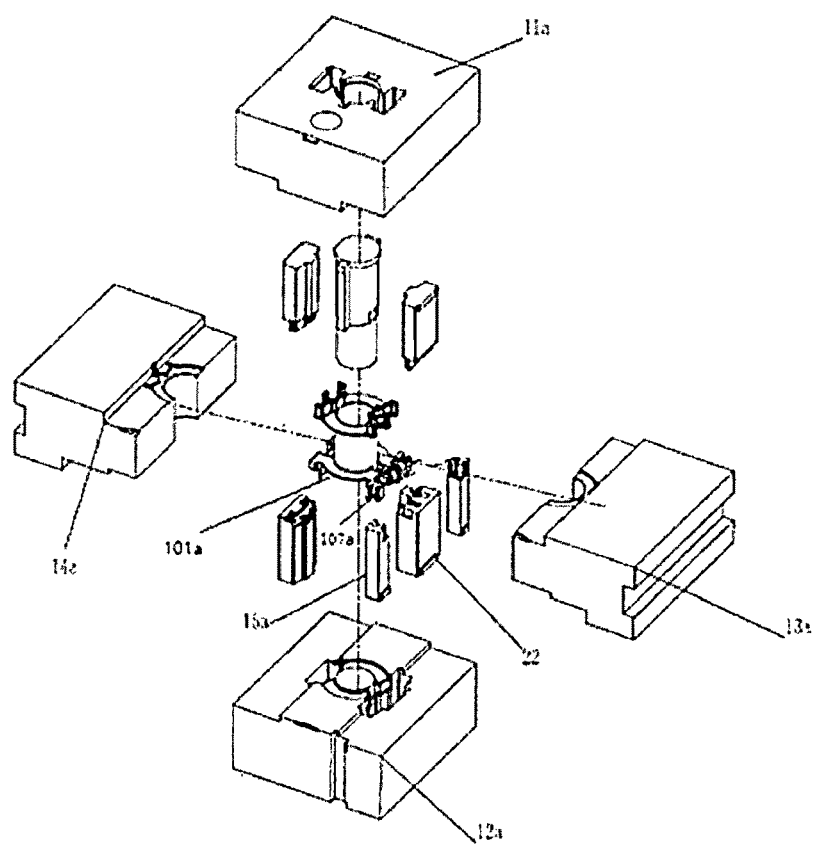
Figures 2, 9:
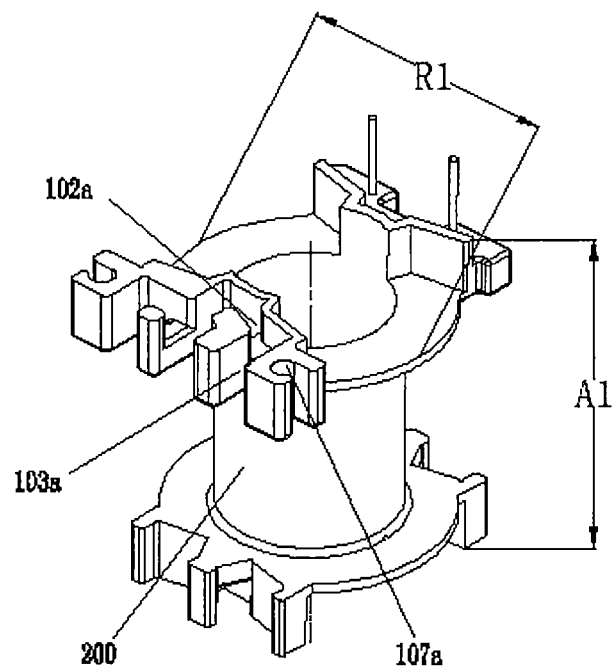
Figure 19:
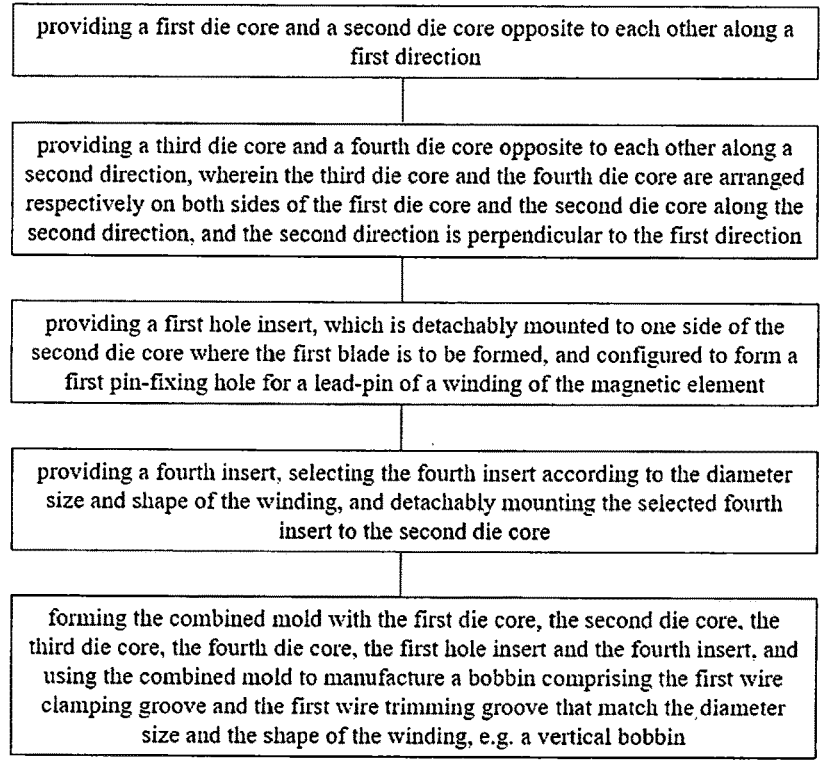
FIG. 19 is a flowchart showing the method for manufacturing the plastic article (e.g. a vertical bobbin) with the first fixing-pin hole, the first wire clamping groove and the first wire trimming groove according to an example of the disclosure.

Referring to FIG. 19 with the reference of FIGS. 9-1 and 9-2, the manufacturing method according to the sixth embodiment further comprises:

providing a fourth insert 22;

selecting the fourth insert 22 according to the diameter size and shape of the winding;

detachably mounting the selected fourth insert 22 to the second die core 12*a*; and forming the combined mold with the first die core 11*a*, the second die core 12*a*, the third die core 13*a*, the fourth die core 14*a*, the first hole insert 15*a* and the fourth insert 22, and using the combined mold to manufacture a bobbin comprising the first wire clamping groove 102*a* and the first wire trimming groove 103*a* that match the diameter size and the shape of the winding, e.g. a vertical bobbin 200.

Structure of the fourth insert 22 is similar with the structure of the first insert 19 in the first to fourth embodiments, the details of which are not repeatedly described here. The dimension of the first hole insert 15*a* and the fourth insert 22 is selected according to the diameter size and the shape of the winding, so that shape, size, opening orientation and/or hole center position of the first pin-fixing hole 107*a*, and/or dimensions of the first wire clamping groove 102*a* and/or the first wire trimming groove 103*a* can be adjusted to obtain a bobbin that matches the diameter size and the shape of the winding.

It shall be noted that in the fifth to sixth embodiments of the disclosure, the first direction is an axial direction of the bobbin.

During injection molded the bobbin, a mold cavity formed by the components in the mold structure is consistent with that of the plastic article (e.g. bobbin). The die cores used in the fifth to sixth embodiments are substantially the same as that used in the first to fourth embodiments, with difference in that, in the fifth to sixth embodiments, the third die core 13*a* and the fourth die core 14*a* are configured to form an external shape of the winding tube of the bobbin, while the first die core 11*a* and the second die core 12*a* are configured to form an internal shape of the winding tube, i.e., a hollow cavity of the winding tube. The first die core 11*a*, the second die core 12*a*, the third die core 13*a* and the fourth die core 14*a* are combined to form the winding tube of the vertical bobbin 200.

Figure 11:
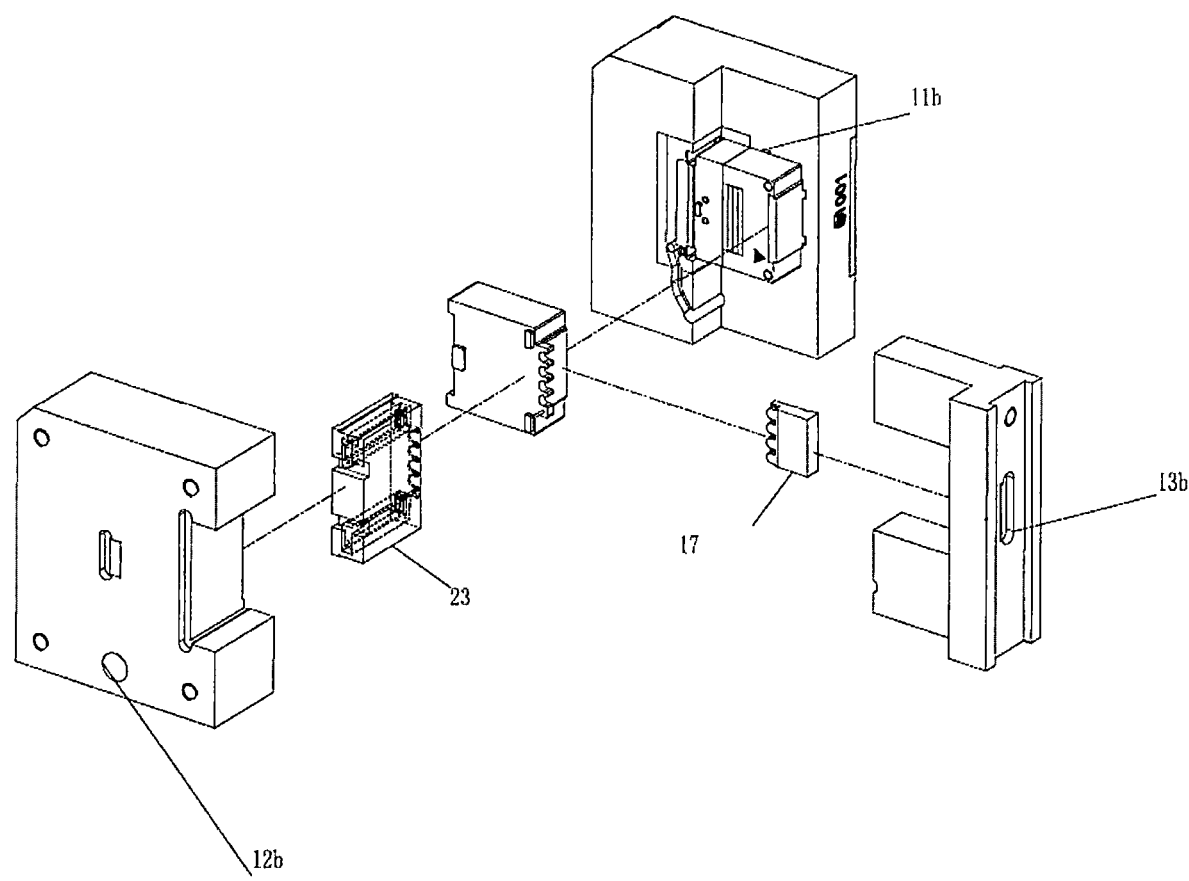
FIG. 11 is a structural diagram of the mold for manufacturing a plastic article for a magnetic element according to the seventh embodiment of the disclosure.
Figure 12:
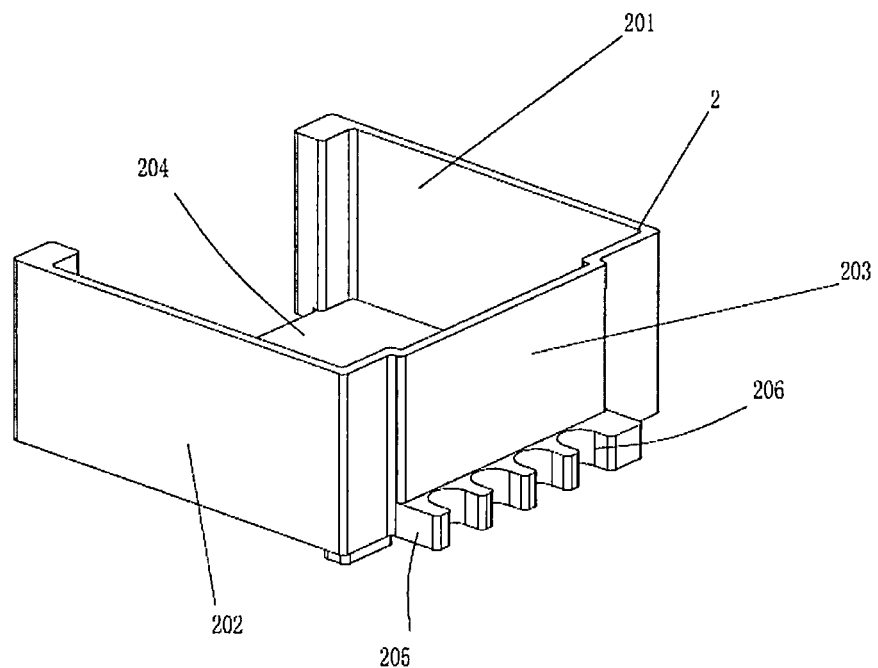
FIG. 12 is a structural diagram of the first plastic article according to the seventh embodiment of the disclosure.
Figure 13:
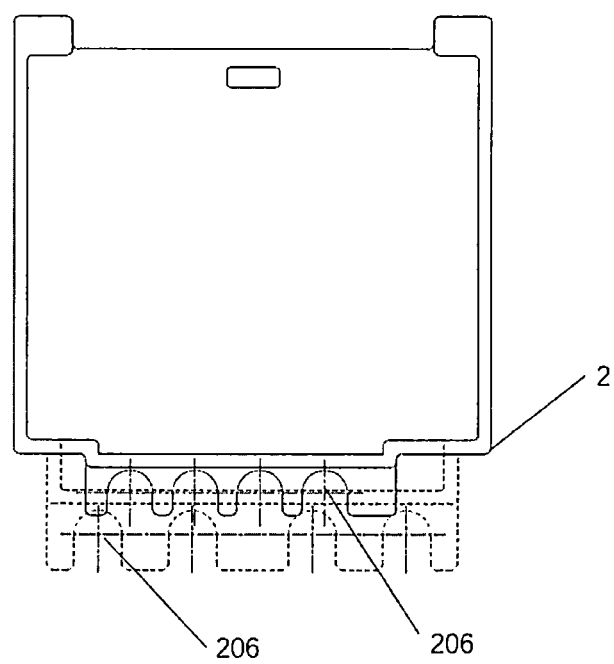
FIG. 13 is a top view of the first plastic article according to the seventh embodiment of the disclosure.

Referring to FIGS. 11-13, FIG. 11 is a structural diagram of a mold for manufacturing a plastic article of a magnetic element in the seventh embodiment of the disclosure, FIG. 12 is a structural diagram of a first plastic article in the seventh embodiment of the disclosure, and FIG. 13 is a top view of the first plastic article in the seventh embodiment of the disclosure. Referring to FIG. 12, in the seventh embodiment of the disclosure, the mold is configured to form a first plastic article 2 (base), which comprises a first bottom plate 204, a vertical plate, and a pin plate 205. The vertical plate is perpendicularly arranged on the first bottom plate 204. Further, the vertical plate comprises a first vertical plate 201, a second vertical plate 202 and a third vertical plate 203. The first vertical plate 201 and the second vertical plate 202 are parallel to each other and arranged on two opposite sides of the bottom plate 204. The third vertical plate 203 is arranged perpendicularly to the first vertical plate 201 and the second vertical plate 202, and located between first vertical plate 201 and the second vertical plate 202. The first vertical plate 201, the second vertical plate 202 and the third vertical plate 203 form a U shape along the bottom plate. The pin plate 205 is arranged on a surface of the third vertical plate 203 in parallel to the bottom plate 204, and comprises a third pin-fixing hole 206. The hole center of the third pin-fixing hole 206 is perpendicular to the first bottom plate 204. Even further, the pin plate 205 and the first bottom plate 204 are arranged in the same plane. A common mold line is produced at an edge of the third pin-fixing hole 206 when an inert is used for injection molding.

Referring to FIG. 11, a mold structure for manufacturing the plastic article for the magnetic element in the seventh embodiment of the disclosure comprises a first die core 11*b*, a second die core 12*b*, a third die core 13*b*, a third hold insert 17 detachably mounted to the third die core 13*b*, and a fifth insert 23 detachably mounted to the second die core 12*b*, wherein the third hold insert 17 and the fifth insert 23 are configured to form the third pin-fixing hole 206 that matches the diameter size and the shape of the winding.

Figure 20:
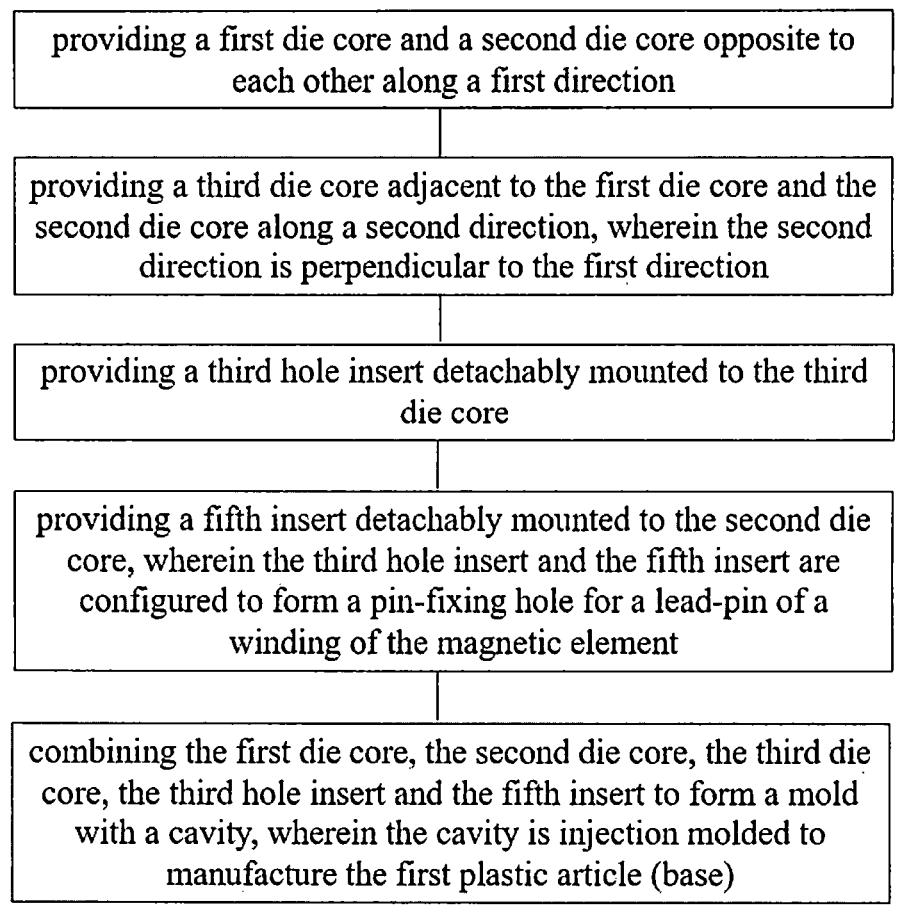
FIG. 20 is a flowchart showing the method for manufacturing the plastic article (e.g. a base) for the magnetic element according to an example of the disclosure.

Referring to FIG. 20 with the reference of FIG. 11, the seventh embodiment of the disclosure discloses a method for manufacturing a plastic article for a magnetic element, comprising:
  providing a first die core 11*b* and a second die core 12*b* opposite to each other along a first direction;
  providing a third die core 13*b* adjacent to the first die core 11*b* and the second die core 12*b* along a second direction, wherein the second direction is perpendicular to the first direction;
  providing a third hole insert 17 detachably mounted to the third die core 13*b*;
  providing a fifth insert 23 detachably mounted to the second die core 12*b*, wherein the third hole insert 17 and the fifth insert 23 are configured to form a pin-fixing hole for a lead-pin of a winding of the magnetic element; and
  combining the first die core 11*b*, the second die core 12*b*, the third die core 13*b*, the third hole insert 17 and the fifth insert 23 to form a mold with a cavity, wherein the cavity is injection molded to manufacture the first plastic article 2 (base).

Structures of the third hole insert 17 and the fifth insert 23 are similar with the structure of the first hold insert 15, the details of which are not repeatedly described here. The respective dimensions of the third hole insert 17 and the fifth insert 23 are selected according to the size and the shape of the winding. Thereby shape, size, opening orientation and/or hole center position of the third pin-fixing hole 206 can be changed to obtain a first plastic article 2 (base) that matches the diameter size and the shape of the winding.

The plastic article in the eighth embodiment is substantially the same as the first plastic article formed in the seventh embodiment, with the differences in that the plastic article formed in the eighth embodiment does not comprise the pin plate, and a fourth pin-fixing hole is located on the third vertical plate, a hole center of which is parallel to the bottom plate. The structure of the mold in the eighth embodiment is substantially the same as that in the seventh embodiment, with the differences in that the third hole insert 17 and the fifth insert 23 in the seventh embodiment is replaced with a fourth hole insert and a sixth insert, respectively, wherein the fourth hole insert and the sixth insert are configured to form the fourth pin-fixing hole that matches the diameter size and the shape of the winding. Structures of the fourth hole insert and the sixth insert are similar with the structure of the first hole insert 15, the details of which are not repeatedly described here. The respective dimensions of the fourth hole insert and the sixth insert are selected according to the size and the shape of the winding. Thereby, shape, size, opening orientation and/or a hole center position of the fourth pin-fixing hole on the third vertical plate can be changed, to obtain the first plastic article 2 (base) that matches the size and the shape of the winding.

Figure 21:
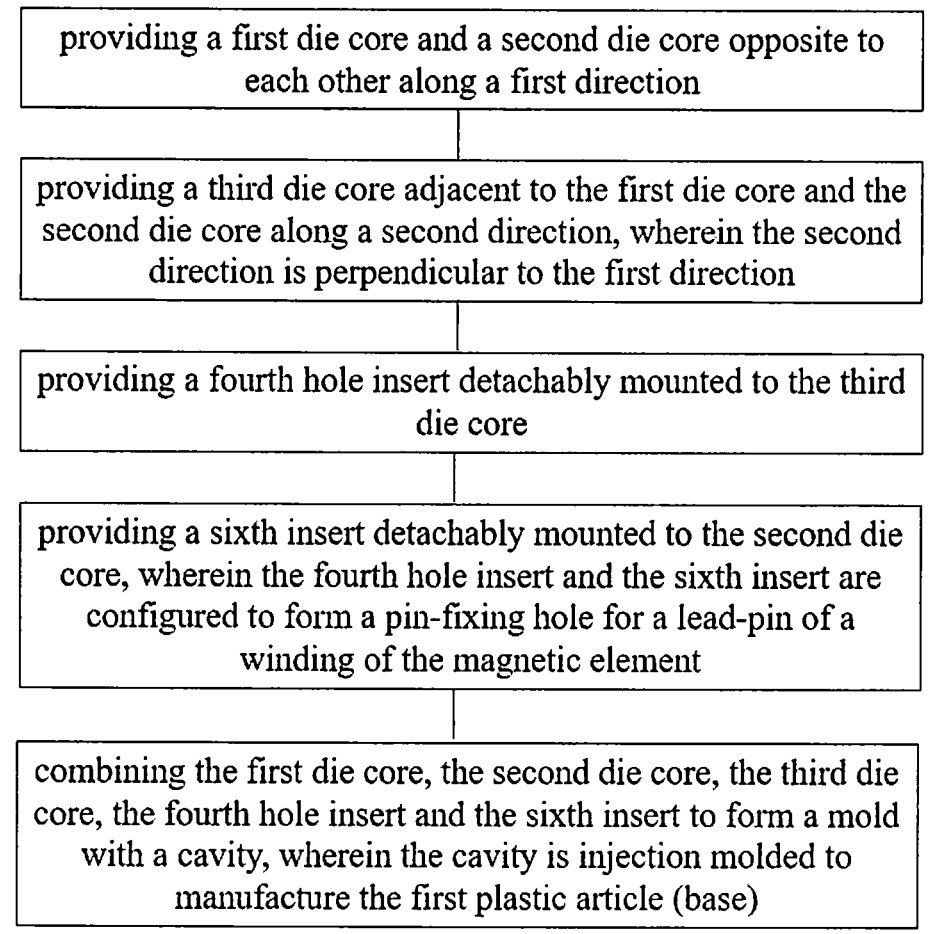
FIG. 21 is another flowchart showing the method for manufacturing the plastic article (e.g. a base) for the magnetic element according to an example of the disclosure.

Referring to FIG. 21, the seventh embodiment of the disclosure discloses a method for manufacturing a plastic article for a magnetic element, comprising:
  providing a first die core and a second die core opposite to each other along a first direction;
  providing a third die core adjacent to the first die core and the second die core along a second direction, wherein the second direction is perpendicular to the first direction;
  providing a fourth hole insert detachably mounted to the third die core;
  providing a sixth insert detachably mounted to the second die core, wherein the fourth hole insert and the sixth insert are configured to form a pin-fixing hole for a lead-pin of a winding of the magnetic element; and
  combining the first die core, the second die core, the third die core, the fourth hole insert and the sixth insert to form a mold with a cavity, wherein the cavity is injection molded to manufacture the first plastic article (base).

In summary, in the first to eighth embodiments of the disclosure, the plastic article is made of thermoplastic material or thermosetting material.

Figure 7:
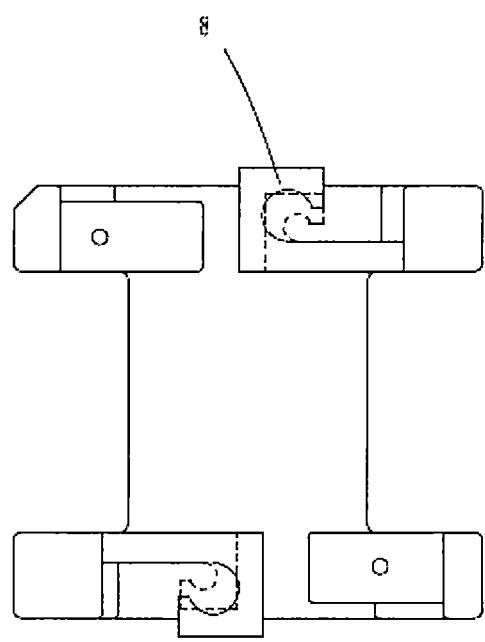
FIG. 7 showing the hole edge thickness of the pin-fixing hole according to the first to eighth embodiments of the disclosure.
Figure 8:
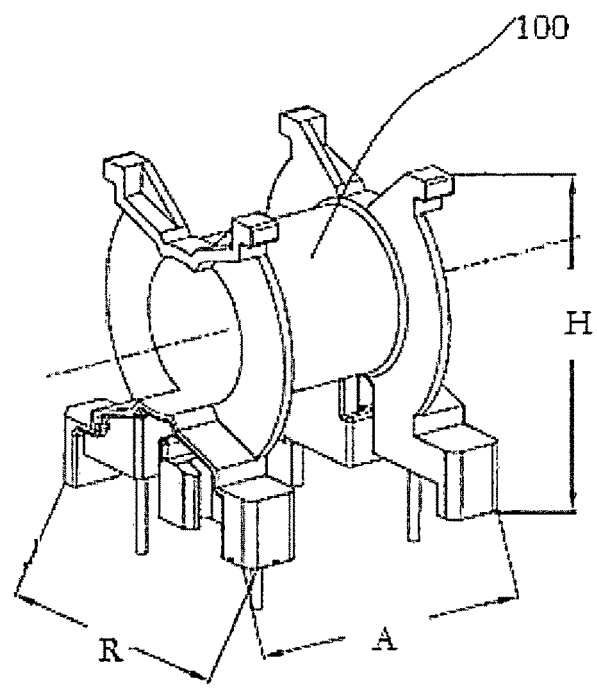
FIG. 8 is a positional diagram of the axial direction, the radial direction and the height of a horizontal bobbin according to the disclosure.

In the first to fourth embodiments, the bobbin formed by the mold is a horizontal bobbin 100, which comprises a constant height and a constant radial length, and an axial length. And the axial length of the bobbin is adjusted according to the shape and the diameter size of the pin-fixing hole. Referring to FIG. 8, positions of the axial length A, the radial length R and a height H of the horizontal bobbin 100 according to the disclosure are schematically illustrated. The axial direction of the horizontal bobbin 100 is an axial direction of the winding tube of the bobbin. The radial direction of the horizontal bobbin 100 is perpendicular to the axial direction of the winding tube of the bobbin. Referring to FIG. 7, in the first to fourth embodiments, a hole edge thickness 8 is left on a periphery of the pin-fixing hole, which can be adjusted according to the diameter size of the pin-fixing hole. According to the disclosure, the traditional common mold method is replaced by a changeable common mold method by only replacing inserts in a small region. And the size, the position and/or the hole edge thickness of the pin-fixing hole may be flexibly adjusted by replacing a suitable insert.

In the fifth to sixth embodiments, the mold is configured to form a vertical bobbin 200, which comprises a constant axial length, and an radial length, and the radial length is adjusted according to the shape and the diameter size of the pin-fixing hole. FIG. 9-2 is a structural diagram of the vertical bobbin for a magnetic element according to the fifth to sixth embodiments of the disclosure, wherein A1 indicates the axial direction of the vertical bobbin 200, and R1 indicates the radial direction of the vertical bobbin 200.

Figure 3:
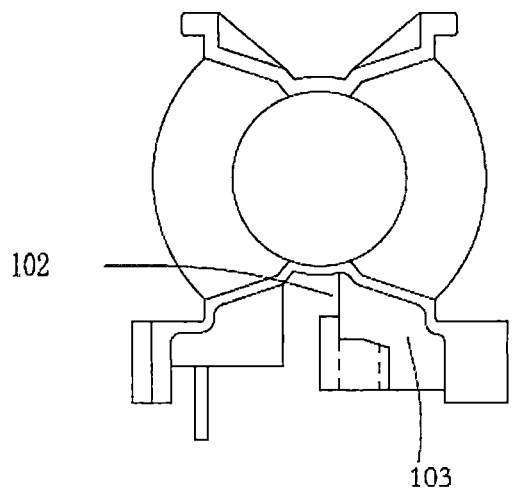
FIG. 3 is a diagram of the positional relationship between the wire clamping groove and the wire trimming groove according to the second to fourth embodiments of the disclosure.

In the second to fourth and the sixth embodiments, the plastic article comprises a winding tube and a blade at an end of the winding tube. The blade comprises a wire clamping groove defined by an opening of the blade and an external wall of the winding tube for locating a lead-pin of a winding; a pin-fixing hole for fixing the lead-pin of the winding of the magnetic element; and a wire trimming groove between the wire clamping groove and the pin-fixing hole. A vertical structure or a S-shaped distorting structure is formed spatially between the adjacent two of the wire clamping groove, the wire trimming groove and the pin-fixing hole. A hole center axis of the pin-fixing hole is perpendicular or parallel to an axial direction of the winding tube. Particularly, when the plastic article is the horizontal bobbin 100, the hole center axis of the pin-fixing hole is perpendicular to an axial direction of the winding tube, while when the plastic article is the vertical bobbin 200, the hole center axis of the pin-fixing hole is parallel to an axial direction of the winding tube. FIG. 3 illustrates the positional relationship between the wire clamping groove and the wire trimming groove in the second to fourth embodiments of the disclosure. FIG. 6 illustrates the lead-pin of the bobbin in the first to sixth embodiments of the disclosure. FIG. 6-1 illustrates a bottom view of the bobbin with the incoming and outgoing lead-pins in the fourth embodiment of the disclosure. It shall be noted that there are common mold lines at the hole edges of the pin-fixing hole, the wire clamping groove and the wire trimming groove, which are produced in injection molding with inserts.

In the seventh embodiment, the plastic article comprises a first bottom plate 204, a vertical plate and a pin plate 205 comprising a pin-fixing hole 206. The vertical plate is arranged perpendicularly on the first bottom plate 204. The pin plate 205 is arranged on a surface of the vertical plate and in parallel to the bottom plate. Further, the pin plate 205 and the bottom plate 204 are in the same plane. There may be a common mold line at the hole edge of the pin-fixing hole 206 on the pin plate 205, which is produced in injection molding with an insert.

In the eighth embodiment, the plastic article comprises a bottom plate and a vertical plate. The vertical is arranged perpendicularly on the bottom plate and comprises a pin-fixing hole with a hole center axis parallel to the bottom plate. There is a common mold line at the hole edge of the pin-fixing hole in the vertical plate, which is produced in injection molding with an insert.

In the mold structure according to the disclosure, the die cores are kept unchanged, while separated inserts are provided to form the pin-fixing holes, which can be changed to match the diameters and/or shapes of the winding. Thus, by using the manufacturing method of the disclosure, the bobbins or bases having the unchanged main bodies but different pin-fixing holes with different diameters and/or shapes can be manufactured by merely changing the suitable inserts without changing the die cores. The bobbins or bases can be integrally manufactured. Thereby, the disclosure satisfies the common mold requirement that one mold structure can apply for different winding diameters within a large range, which saves the mold cost. Since the hole center position can be adjusted by changing the inserts, a layout space is saved. Such common mold solution for different windings with varied wire diameters can be adapted to vertical bobbin, horizontal bobbin or base, etc.

Although several preferred embodiments of the present disclosure have been described, the present disclosure may be used with other configurations. It will be appreciated by those skilled in the art that, the present disclosure could have many other embodiments, and changes and modifications may be made thereto without departing from the disclosure in its broader aspects and as set forth in the following claims and equivalents thereof.

What is claimed is:

1. A method for manufacturing a plastic article for a magnetic element, the method comprising:
    providing a first die core and a second die core opposite to each other along a first direction;
    providing a third die core adjacent to the first die core and the second die core along a second direction, wherein the second direction is perpendicular to the first direction;
    providing at least one hole insert for forming a pin-fixing hole for fixing a lead-pin of a winding of the magnetic element, wherein the at least one hole insert is detachably mounted to at least one of the first die core, the second die core, and the third die core; and
    combining the first die core, the second die core, the third die core, and the at least one hole insert to form a mold with a cavity, wherein the cavity is injection molded to manufacture the plastic article.

2. The method according to claim 1, wherein the at least one hole insert comprises a hole insert body and a core pin, and the core pin is configured to form the pin-fixing hole.

3. The method according to claim 2, wherein the core pin has a cross section of circular, square, rectangular, racetrack-shaped, U-shaped or C-shaped.

4. The method according to claim 1, further comprising:
    providing a fourth die core opposite to the third die core along the second direction.

5. The method according to claim 4, wherein the plastic article is a bobbin.

6. The method according to claim 5, wherein the first direction is an axial direction or a radial direction of the bobbin.

7. The method according to claim 5, wherein the bobbin comprises:
    a winding tube for winding; and
    a first blade located at one end of the winding tube and comprising a first pin-fixing hole for fixing the winding.

8. The method according to claim 7, wherein the at least one hole insert comprises a first hole insert, and
    the method further comprising
        selecting a dimension of the first hole insert according to diameter size and shape of the winding; and
        detachably mounting the selected first hole insert to a side of the first die core or second die core where the first blade is to be formed.

9. The method according to claim 8, wherein the first blade further comprises a locating structure for limiting the winding, and the locating structure comprises a first wire clamping groove and a first wire trimming groove, wherein the winding that enters the bobbin via the first pin-fixing hole and forms an incoming lead-pin in the first pin-fixing hole passes through the first wire trimming groove, and then is located by the first wire clamping groove, and finally is wound around the winding tube of the bobbin.

10. The method according to claim 9, further comprising:
providing a first insert;
selecting respective dimensions of the first hole insert and the first insert according to the diameter size and the shape of the winding;
detachably mounting the selected first insert to the third die core; and
forming the combined mold with the selected first hole insert and the selected first insert, and using the combined mold to manufacture a bobbin comprising the first wire clamping groove and the first wire trimming groove that match the diameter size and the shape of the winding.

11. The method according to claim 9, further comprising:
providing a fourth insert;
selecting the fourth insert according to the diameter size and the shape of the winding;
detachably mounting the selected fourth insert to the second die core; and
forming the combined mold with the selected fourth insert, and using the combined mold to manufacture a bobbin comprising the first wire clamping groove and the first wire trimming groove matching the diameter size and the shape of the winding.

12. The method according to claim 7, wherein the bobbin further comprises a second blade located at an opposite end of the winding tube and comprising a second pin-fixing hole for fixing the winding.

13. The method according to claim 12, wherein the at least one hole insert further comprises a second hole insert,
the method further comprising:
selecting a dimension of the second hole insert according to the diameter size and the shape of the winding;
detachably mounting the selected second hole insert to a side of the first die core where the second blade is to be formed; and
forming the combined mold with the selected second hole insert, and using the combined mold to manufacture a bobbin comprising the second pin-fixing hole having desired shape, size, opening orientation, and/or hole center position.

14. The method according to claim 13, wherein the second blade further comprises a locating structure for limiting the winding, and the locating structure comprises a second wire clamping groove and a second wire trimming groove, wherein the winding wound out of the winding tube is limited by the second wire clamping groove, and then passes through the second wire trimming groove, and finally is lead out via the second pin-fixing hole and forms an outgoing lead-pin.

15. The method according to claim 14, further comprising:
providing a second insert and a third insert;
selecting respective dimensions of the second insert and the third insert according to the diameter size and the shape of the winding;
detachably mounting the selected second insert to the first die core, and detachably mounting the selected third insert to the fourth die core; and
forming the combined mold with the selected second hole insert, the selected second insert, and the selected third insert, and using the combined mold to manufacture a bobbin comprising the second wire clamping groove and the second wire trimming groove matching the diameter size and the shape of the winding.

16. The method according to claim 1, wherein a hole edge thickness is left on a periphery of the pin-fixing hole, which is adjusted according to diameter size of the pin-fixing hole.

17. The method according to claim 1, wherein the plastic article is a horizontal bobbin having a constant height, a constant radial length, and an axial length adjusted according to the shape and diameter size of the pin-fixing hole.

18. The method according to claim 1, wherein the plastic article is a vertical bobbin having a constant axial length, and a radial length adjusted according to shape and diameter size of the pin-fixing hole.

19. The method according to claim 1, wherein the plastic article comprises:
a bottom plate,
a vertical plate perpendicular to the bottom plate, and
a pin plate comprising a third pin-fixing hole and arranged on the vertical plate in parallel to the bottom plate.

20. The method according to claim 19, wherein the pin plate and the bottom plate are in the same plane.

21. The method according to claim 19, wherein the at least one hole insert comprises a third hole insert;
the method further comprising:
providing a fifth insert;
selecting respective dimensions of the third hole insert and the fifth insert according to diameter size and shape of the winding;
detachably mounting the selected third hole insert to the third die core, and detachably mounting the selected fifth insert to the second die core; and
forming the combined mold with the selected third hole insert and the selected fifth insert, and using the combined mold to manufacture the plastic article comprising the third pin-fixing hole having desired shape, size, an opening orientation and/or a hole center position.

22. The method according to claim 1, wherein the plastic article comprises:
a bottom plate, and
a vertical plate perpendicular to the bottom plate and comprising a fourth pin-fixing hole.

23. The method according to claim 22, wherein the at least one hole insert comprises a fourth hole insert;
the method further comprising:
providing a sixth insert;
selecting respective dimensions of the fourth hole insert and the sixth insert according to diameter size and shape of the winding;
detachably mounting the selected fourth hole insert to the third die core, and detachably mounting the selected sixth insert to the second die core; and
forming the combined mold with the selected fourth hole insert and the selected sixth insert, and using the combined mold to manufacture the plastic article the fourth pin-fixing hole having desired shape, size, opening orientation, and/or a hole center position.

24. The method according to claim 1, wherein the plastic article is made of a thermoplastic material or a thermosetting material.

* * * * *